(12) United States Patent
Thiesse et al.

(10) Patent No.: US 12,088,824 B2
(45) Date of Patent: Sep. 10, 2024

(54) METHOD FOR ENCODING AND DECODING VIDEO BY SIGNALING OF A CANDIDATE SUB-ASSEMBLY

(71) Applicant: S.A. VITEC, Paris (FR)

(72) Inventors: Jean-Marc Thiesse, Chatillon (FR); David Gommelet, Chatillon (FR); Didier Nicholson, Chatillon (FR); Madhukar Bhat, Chatillon (FR)

(73) Assignee: S.A. VITEC, Paris (FR)

( * ) Notice: Subject to any disclaimer, the term of this patent is extended or adjusted under 35 U.S.C. 154(b) by 318 days.

(21) Appl. No.: 17/620,994

(22) PCT Filed: Jun. 26, 2020

(86) PCT No.: PCT/FR2020/051124
§ 371 (c)(1),
(2) Date: Dec. 20, 2021

(87) PCT Pub. No.: WO2020/260843
PCT Pub. Date: Dec. 30, 2020

(65) Prior Publication Data
US 2022/0368923 A1    Nov. 17, 2022

(30) Foreign Application Priority Data

Jun. 27, 2019  (FR) ...................................... 1907069

(51) Int. Cl.
*H04N 19/157*  (2014.01)
*H04N 19/103*  (2014.01)
(Continued)

(52) U.S. Cl.
CPC ......... *H04N 19/157* (2014.11); *H04N 19/103* (2014.11); *H04N 19/136* (2014.11); *H04N 19/463* (2014.11)

(58) Field of Classification Search
CPC .. H04N 19/157; H04N 19/103; H04N 19/136; H04N 19/463
See application file for complete search history.

(56) References Cited

U.S. PATENT DOCUMENTS 11,818,343 B2 *  11/2023  Zhao .................... H04N 19/46
2006/0153299 A1 *  7/2006  Iwata .................. H04N 19/172
375/E7.181
(Continued)

OTHER PUBLICATIONS

International Search Report issued on Oct. 2, 2020, in corresponding International Application No. PCT/FR2020/051124; 7 pages (with English Translation).
(Continued)

*Primary Examiner* — Fabio S Lima
(74) *Attorney, Agent, or Firm* — Maier & Maier, PLLC

(57) ABSTRACT

A method for decoding a bitstream comprising a sequence of encoded images. The method includes: obtaining first information from first encoded data contained in the bitstream; determining a list of coding parameters on the basis of the first information and of at least one predefined list of coding parameters; obtaining second information from second encoded data contained in the bitstream, the second information corresponding to a coding parameter among the coding parameters in the list of coding parameters; determining an element of a reconstructed image corresponding to an element of an image in the sequence of images, by means of the coding parameter corresponding to the second information and of encoded data representative of the element of the image in the sequence; wherein the size of the second encoded data depends on the number of coding parameters in the list of coding parameters.

20 Claims, 7 Drawing Sheets

(51) Int. Cl.
*H04N 19/136* (2014.01)
*H04N 19/463* (2014.01)

(56) References Cited

U.S. PATENT DOCUMENTS

| | | | | |
|---|---|---|---|---|
| 2011/0206289 A1* | 8/2011 | Dikbas | ................... | H04N 19/13 |
| | | | | 382/238 |
| 2012/0328026 A1* | 12/2012 | Sole Rojals | ........... | H04N 19/13 |
| | | | | 375/240.18 |
| 2013/0114694 A1* | 5/2013 | Chen | ...................... | H04N 19/70 |
| | | | | 375/240.03 |
| 2014/0294067 A1* | 10/2014 | Li | ......................... | H04N 19/174 |
| | | | | 375/240.02 |
| 2019/0281290 A1* | 9/2019 | Lee | ...................... | H04N 19/463 |

OTHER PUBLICATIONS

Bhat (Vitec) et al., "AHG 10: Adaptive Coding Sub-set for encoder optimization"; Joint Video Experts Team (JVET-O0888), Jul. 2, 2019; 15th JVET Meeting; Jul. 3, 2019-Jul. 12, 2019; Gothenburg; (The Joint Video Exploration Team of ISO/IEC JTC1/SC29/WG11 and ITU-T SG.16); XP030220497; 7 pages.

Bhat (Vitec) et al., "AHG 10/CE3-related: Adaptive coding subset for intra mode"; Joint Video Experts Team (JVET-P0638, Oct. 2, 2019; 16th JVET Meeting; Oct. 10, 2019-Oct. 11, 2019; Geneva; (The Joint Video Exploration Team of ISO/IEC JTC1/SC29/WG11 and ITU-T SG.16); XP030217905; 5 pages.

* cited by examiner

METHOD FOR ENCODING AND DECODING VIDEO BY SIGNALING OF A CANDIDATE SUB-ASSEMBLY

FIELD

This description relates to the field of video compression, and more specifically to video encoders and decoders.

BACKGROUND

The description can be applied in particular to the protocols for selecting prediction modes in MPEG video compression standards, for example such as AVC (h.264) for "Advanced Video Coding", HEVC (h.265) for "High Efficiency Video Coding", and future MPEG compression standards such as VVC (h.266) for "Versatile Video Coding".

Conventional video compression schemes have been based on the same principles since the first generation of the MPEG standard, MPEG2. The images in a video sequence or video stream are considered sequentially and divided into elements, which in turn can be divided into elements. These elements may be, for example, macroblocks (MB), "coding tree units" (CTU), or blocks, "coding units" (CU), or "prediction units" (PU).

The division of images into elements and/or pixel elements, during the processes of encoding a video sequence, allows the image data to be processed locally. Different types of processing associated with coding parameters can be used to encode each element.

The different types of processing can generally be used to improve, for example, the video compression process when encoding video. For example, one type of processing can be an intra prediction comprising intra prediction modes as coding parameters. In another example, the type of processing can be the application of a sample adaptive offset filter comprising offset values as coding parameters. According to another example, the type of processing can be an inter prediction comprising modes called "merge modes" as coding parameters.

Depending on the compression standards and the types of coding parameters, a certain number of coding parameters are available for encoding and decoding. This number of coding parameters may, depending on the type and the compression standard, be relatively large and thus lead to substantial signaling which can reduce compression performance accordingly in the event of suboptimal or incomplete use of the set of coding parameters. Incomplete use can occur during a precise implementation of an encoder with tight constraints of speed of execution or complexity, leading the manufacturer to avoid using all the parameters. Suboptimal use of coding parameters can occur with specific content and/or a point of use of the encoder.

Generally, the evolution of a compression standard, such as the MPEG-type compression standard for example, implies a compression gain but also an increase in the number of coding parameters available for a same processing type. For example, there are 35 intra prediction modes for the HEVC standard, and 67 for the future VVC compression standard.

The coding parameters used during video encoding are required when decoding the corresponding bitstream. The encoder therefore must signal them to the decoder in the bitstream, but at a certain signaling cost. This signaling can represent a certain number of bits which affects compression performance, especially if it is not compensated for by a sufficient gain in compression quality. The signaling may consist, for example, of signaling a coding parameter. For example, when the coding parameters are intra prediction modes in the HEVC standard, the signaling of the prediction mode selected by the encoder for an element represents up to 5 bits. This means that the encoder encodes the index value corresponding to this intra prediction mode among 35 prediction modes. In the case of the future VVC compression standard, this signaling is carried out with up to 6 bits in order to cover the 67 prediction modes.

The total cost of signaling can thus quickly become significant. This signaling is all the more significant when the number of coding parameters available is large and the number of elements to be encoded is large.

The invention improves the situation.

SUMMARY

To this end, a method is proposed for decoding a video bitstream corresponding to a sequence of images, the method comprising:
  obtaining first information from first encoded data contained in the bitstream;
  determining a list of coding parameters on the basis of the first information and of at least one predefined list of coding parameters;
  obtaining second information from second encoded data contained in the bitstream, the second information corresponding to a coding parameter among the coding parameters in the list of coding parameters;
  determining an element of a reconstructed image corresponding to an element of an image in the sequence of images, by means of said coding parameter corresponding to the second information and of encoded data representative of the element of the image in the sequence;
wherein the size of the second encoded data depends on the number of coding parameters in the list of coding parameters.

This allows a sequence of images encoded in a bitstream to be decoded on the basis of a list of coding parameters included in the predefined list of coding parameters. The number of coding parameters available for encoding and decoding can thus be reduced. It is therefore possible to reduce the size of the signaling assigned to the coding parameters, meaning the second encoded data. Advantageously, the list of parameters is strictly included in the predefined list, thus making it possible to reduce the size of the signaling regardless of the element to be decoded.

In addition, advantageously, this reduction in the number of coding parameters upstream can make it possible to reduce the encoding or decoding calculation time and/or to reduce the hardware resources required, in particular for example when the selection of a coding parameter from a list of coding parameters requires testing them all in order to select the optimal coding parameter.

Coding parameter is understood to mean a parameter on the basis of which the encoded data representative of an element are obtained. In other words, coding parameter is understood to mean a function or a parameter of a function which allows obtaining the encoded data representative of an element. For example, a coding parameter can allow determining a predictive element whose differential with the element to be encoded is the residual. Such a coding parameter can thus be a prediction mode, meaning that the coding parameter can indicate an element of an image in the image sequence (either from the same image or from an image different than that of the element which is to be encoded/decoded). The coding parameter may also allow calculating a residual once the predictive element (i.e. indicated by a prediction mode) of the element to be encoded/decoded has been determined.

An element of the image is understood to mean a unit for processing. These units for processing divide or split the image into groups of pixels. This element may represent a set of pixels or correspond to a single pixel, an image being divided into elements which are then processed for the encoding or decoding. For example, the elements may be macroblocks, CTUs (coding tree units), or CTBs (coding block units). Each element can be further divided into smaller elements of fixed size of 4×4, 8×8, 16×16, 32×32, 64×64, or 128×128 pixels or rectangular elements. These elements of smaller size may be for example blocks, CUs (coding units), CBs (coding blocks), prediction units (PUs), predict blocks (PBs), transform units (TUs), or transform blocks (TBs).

Obtaining first information from first data encoded in the bitstream is understood to mean the decoding of the first encoded data comprising the first information. This first information can therefore be signaled in the bitstream by the encoder through the first encoded data. This first information may include, for example, information relating to a management mode for coding parameters (indication of a management mode for coding parameters, configuration of the management mode used for encoding, etc.). Management mode for coding parameters is understood to mean a mode defining the manner in which the lists of coding parameters are determined on the basis of the first information (for example coding characteristics) and of the predefined list of coding parameters.

Several management modes may be indicated in the first information, in order to determine several lists of coding parameters from the same predefined list of coding parameters, thus making it possible to use the most suitable list for the encoding or decoding of each element of an image according to different needs (for example characteristic of the image, characteristic of the element, etc.).

Predefined list of coding parameters is understood to mean a list including a finite number of coding parameters. This number can be based on the compression standard used for encoding the video sequence, and on the type of coding parameters. For example: prediction modes or offset values of what is termed an "offset" filter. The type of coding parameters can be determined according to the first information. The predefined list of coding parameters can include an indexing of coding parameters, for example from 0 to N−1 with N being a positive integer.

For example, if the coding parameters are intra prediction modes in the HEVC compression standard, the predefined list contains 35 coding parameters or intra prediction modes. According to another example, in the case of the future VVC compression standard, the predefined list of coding parameters would then include 67 intra prediction modes for an element, for example CUs.

According to another example, if the coding parameters are offset values used during "sample adaptive offset" (SAO) filtering for pixels encoded in 10 bits in the HEVC standard or future VVC standard, the predefined list of coding parameters can then include 32 offset values for an element, for example a CTU.

Determining a list of coding parameters can be understood to mean determining at least one list of coding parameters that is strictly included in at least one predefined list of coding parameters. The list of coding parameters may include an indexing of the coding parameters, for example from 0 to i, with i being a positive integer strictly less than N−1.

Obtaining second information from second encoded data in the bitstream is understood to mean the decoding of second encoded data comprising second information. This second information can therefore be signaled in the bitstream by the encoder through the second encoded data. This second information allows indicating to the decoder the coding parameter to be used, among the coding parameters of the determined list, for the determination of an element in the reconstructed image.

Since the encoder and decoder have the same determined list of coding parameters, when the encoder signals the coding parameter to be used for decoding among the list of coding parameters, the decoder can retrieve this coding parameter from the same list of coding parameters.

Determining an element of a reconstructed image corresponding to an element of an image in the sequence of images (or simply determining an element of an image) is understood to mean the fact of reconstructing the pixels contained in this element of the image by applying the coding parameter signaled in the second information. The coding parameter relates to a processing type, for example a prediction, intra or inter, or the application of an SAO filter. Thus, the determination of the element by a specific processing type consists of applying a coding parameter of that type.

The size of the second encoded data can be understood to mean a size which can be defined by a number of bits. The second encoded data may correspond to an index of a coding parameter signaled in the bitstream by the encoder, this index being the index of one of the coding parameters included in the indexed list of coding parameters determined by the decoder. The number of bits used to encode the index depends on the number of coding parameters in the determined indexed list.

Thus, during the decoding of an image in a sequence of images, i.e. the decoding of the elements of this image, for each element there can be signaled, by the second information, the index of a coding parameter to be used among a reduced number of coding parameters included in the list of coding parameters determined by the decoder. The signaling cost in bits can thus be reduced.

Advantageously, the list of coding parameters can be determined by selecting coding parameters from the predefined list of coding parameters or by selecting among a plurality of predefined lists of coding parameters.

Thus, either the list is determined by a selection of coding parameters within the predefined list or the selection is carried out upstream of the obtaining of the first information and therefore independently thereof, meaning that several sub-lists of coding parameters are predetermined, the determination of the list then consisting of selecting one of these predetermined sub-lists. The predetermined sub-lists of coding parameters are sub-lists of the predetermined list. This makes it possible to reduce the size of the first information needed to determine the list.

The selection of coding parameters within the predefined list makes it possible to adapt, on the basis of the image, the number of coding parameters that can be used, and when several lists are determined by selection from the predefined list then it is possible to adapt the number of coding parameters on the basis of the elements. Thus, two elements from a same image can be encoded/decoded with determined lists of different sizes. For example, the elements of an image encoded/decoded in intra mode from an intra-refresh region (within the framework of intra-refresh encoding) could be encoded/decoded by means of a list including more coding parameters than the elements of the image encoded/decoded in intra mode outside the intra-refresh region.

According to one or more embodiments, the first encoded data and/or the second encoded data may be comprised in a signaling portion of the bitstream. The signaling portion can make it possible to simplify the decoding of a video sequence by providing information, for example, about the structure of the images, the type of image, the encoding resolution, etc. The general signaling portion of the HEVC standard consists of a "Video Parameter Set" (VPS) field (also called NAL), a "Sequence Parameter Set" (SPS) field, and a "Picture Parameter Set" (PPS) field. The future VVC standard would include at least the SPS and PPS fields.

The VPS field comprises information relating to the video. The VPS field comprises, for example, information relating to the "Profile", the "Level", and the "Tier", which define decoding properties.

The SPS field comprises information relating to the sequence of images considered. In principle, all images in the sequence use the same SPS. The SPS field comprises in particular information relating to the coding tools used, or important parameters describing the properties of the encoded sequence (for example the size of the images).

The PPS field comprises information relating to each image, although several images may refer to the same PPS in order to reduce the size of the signaling. The PPS comprises in particular additional information relating to the coding tools used in the image(s) which refer to it (for example "intra prediction mode"). For example, the first and second information can be signaled in this PPS field.

According to another example, the first and second information can be signaled in the header of the "slices" of the image in the sequence of images.

In addition, the first encoded data and/or the second encoded data can be signaled according to a signaling mechanism specific to the type of coding parameter.

Advantageously, the list of coding parameters can be a function of encoding characteristics of elements of the image.

It is thus possible to use different determined lists to decode elements of the image, according to specific characteristics of these elements. Thus, a first list can be used to encode/decode a first element, and a second list to encode/decode a second element of the same image. For this purpose, it is possible to determine for a given image (or a group of given images), on the basis of the first information, a plurality of lists of coding parameters from which a list is selected on the basis of the encoding characteristics of the element to be decoded/encoded in this given image. The determined lists are obtained before proceeding with the decoding/encoding of the elements of the image to be decoded, meaning that the determined lists are obtained before the decoding of a set of elements in the image. At the time of encoding/decoding an element, a list among the plurality of determined lists for the image is selected on the basis of the encoding characteristics of this element, these encoding characteristics being specific to the element to be encoded/decoded. The first information may include the encoding characteristics of the elements. In both cases, it is thus possible to have great freedom in determining the list or lists of coding parameters in order to adapt to the specific characteristics of each element to be encoded/decoded. Advantageously, at least two lists are determined and at least two elements of the image are respectively encoded/decoded with different determined lists.

The encoding characteristics of elements of the image are specific to the element to be encoded/decoded. They can thus depend only on this element, namely if one of the elements of the image to be encoded/decoded is changed, the encoding characteristics of the element to be encoded/decoded are not changed.

Advantageously, the encoding characteristics of elements of the image comprise an element size and/or an element quantization step size (QS) and/or an element chrominance type and/or an element brightness type and/or an element intra encoding type and/or an element inter encoding type and/or a transform size and/or a transform type and/or a filter type.

Element size can be understood to mean a size defined by a number of pixels, for example 64×64 pixels.

Element chrominance type and element brightness type are understood to mean a brightness component known as "luma", Y, and a color component known as "chroma", U or V, of the pixels of the element.

Element intra encoding is understood to mean that the element of image I is encoded in intra, meaning that the element is not encoded based on an element of an image other than image I.

Element inter encoding is understood to mean that the element of image I is encoded in inter, meaning that the element is encoded at least based on an element of an image other than image I.

A first element encoded from a second element is understood to mean that the prediction mode (Intra, Inter, etc.) used to encode the first element and which is signaled in the encoded data representative of the first element targets or indicates to use the second element (i.e. the values of the second element once decoded) to encode the first element.

Transform size can be understood to mean a discrete cosine transform (DCT) size of 4×4, 8×8, 16×16, 32×32, or 64×64 pixels.

Transform type can be understood to mean a type DCT-II or a type DST-VII or a type DCT-VIII.

Type of filter can be understood to mean a sample adaptive offset filter (SAO) of the "Edge" or "Band" type, a "Deblocking Filter", or an "Adaptive Loop Filter" ALF.

Advantageously, the determination of the list of coding parameters can be done by selecting, from the predefined list of coding parameters, coding parameters specified by the first information.

Thus, the first information obtained by decoding the first encoded data includes information explicitly indicating the coding parameters to be selected. For example, the first information includes a list of indices corresponding to coding parameters in the predefined list or lists when the latter are indexed, for example from 0 to N−1, N being a positive integer. This is termed an "explicit" management mode. Thus, in the "explicit" management mode, instructions can explicitly indicate the coding parameters that the decoder can select among one or more predefined lists of coding parameters, making it possible to construct for example a first list of coding parameters.

Advantageously, the instructions can indicate several sets of coding parameters for the determination of several lists of coding parameters.

Advantageously, the predefined list of coding parameters can be indexed from 0 to N−1, with N being a number of coding parameters in the predefined list of coding parameters, and the determination of the list of coding parameters can be done by selecting, on the basis of the first information:

coding parameters of indices k+n·m in the predefined list, with n a strictly positive integer and k a positive integer or zero and n+k less than or equal to N−1, and m between 0 and the integer part of (N−k−1)/n; and coding parameters of indices strictly less than k' in the predefined list, with k' a positive integer or zero and less than or equal to k.

It is thus possible to determine one or more lists of coding parameters in a simple manner and with a small signaling size. It may thus be possible to transmit a minimum amount of instructions in the first data in order to reduce the overall cost of signaling in the bitstream. In addition, such a selection from the predefined list is regular, meaning the selected coding parameters are regularly distributed in the predefined list. Thus, if coding parameter ($p_1$) in the predefined list that the encoder/decoder would use to encode/decode the element has not been selected in the determined list used to encode/decode the element of the image, then the index difference between coding parameter ($p_1$) and the coding parameter ($p_2$) in the determined list actually used by the encoder/decoder to encode/decode the element remains less than n/2 and in any case less than n. However, due to the ordering of the coding parameters, the difference between residuals obtained with two coding parameters of close indices is smaller on the average than the difference between residuals obtained with two coding parameters of more distant indices. Thus, with a list determined by such a selection, on the average we obtain closer residuals than those which would have been obtained using the predefined list. This reduces the amount of encoded data needed to encode residuals of elements of the image while reducing the signaling required to signal each coding parameter. In addition, this type of selection allows obtaining determined lists whose structure/construction is similar to that of the predefined list, which allows not straying too far from the construction of the predefined list. The CABAC arithmetic coder will thus be less impacted.

The coding parameters of index k+n·m are selected from the predefined list, with m ranging from 0 to the integer part of (N−k−1)/n. The term k can allow defining an offset in the selection of coding parameters.

The management mode enabling such a selection is called "decimation" management mode. The positive integers k and n, as well as information indicating that "decimation" management mode is activated, are sufficient for the decoder to be able to determine a list of coding parameters according to this management mode. Thus, the first information can include the integers k, n. The integer n represents a decimation factor making it possible to select a coding parameter from a predefined list of coding parameters, every n coding parameters.

According to one or more embodiments, n and m can be determined as a function of a hierarchical level of the image relative to the images in the sequence of images.

Hierarchical level of the image relative to the images in the sequence of images or more generally in a grouping of images or group of images (GOP), is understood to mean that in the case where the images in a set of images use previously encoded images, hierarchical level 0 is the one whose images serve as references for subsequently encoded images and which themselves only use intra predictions or images of hierarchical level 0; hierarchical level 1 can use images of hierarchical level 0 or 1, and so on. Images at the last hierarchical level are often not referenced by any other image.

Thus, the lists of coding parameters used to encode/decode each image can therefore include a different number of coding parameters depending on the hierarchical level of the images.

Advantageously, the determination of the list of coding parameters can be done by selecting the coding parameters from the predefined list (on the basis of the first information), as a function of the levels of frequency of use of the coding parameters of the predefined list.

Frequency of use of a coding parameter is understood to mean the number of times that the coding parameter has been used for the determination of previous reconstructed image elements. More specifically, the number of times this coding parameter has been used for decoding elements of the image currently being decoded and/or of previous images.

Such a selection from the predefined list makes it possible to select the coding parameters most likely to be used with regard to the previous images. This is relevant when encoding/decoding elements in intra as well as in inter. This is because spatial predictions with high levels of frequency of use in a previous image are more likely to have high levels of frequency of use in the image being encoded/decoded. Thus, the coding parameters from the predefined list that the encoder/decoder would use to encode/decode the elements of the image being processed are more likely to be selected from the determined lists. Thus, with a list determined by such a selection, on the average we obtain residuals closer to those which would have been obtained using the predefined list. This reduces the amount of encoded data needed to encode the residuals of the elements of the image, while reducing the signaling required to signal each coding parameter.

As an example, the selection from the predefined list on the basis of the levels of frequencies of use can be done by selecting the coding parameters with a level of frequency of use that is above a threshold or by selecting a predefined number of coding parameters having the highest levels of frequencies of use among the coding parameters of the predefined list.

The management mode enabling such a selection is called the "histogram" management mode. The threshold or the predefined number of coding parameters having the highest levels of frequencies of use may be included in the first information. Thus, the information included in the first information is information indicating that the "histogram" management mode is activated as well as the associated threshold or number. This mode of selection thus requires little signaling.

Advantageously, the predefined list of coding parameters can be indexed and the determination of the list of coding parameters can be done by selecting, on the basis of the first information:

primary coding parameters specified by the first information; and secondary coding parameters such that an index of each secondary coding parameter is comprised in $U_k[i(p)_k - \mu_k; i(p)_k + \mu_k]$ where $i(p)_k$ are the indices of the primary coding parameters and $\mu_k$ are strictly positive integers specified by the first information.

It is thus possible to determine one or more lists of coding parameters with little signaling. Indeed, it is possible to transmit a minimum amount of instructions in the first data, and reduce the overall cost of signaling in the bitstream.

Certain coding parameters (the primary coding parameters) are explicitly indicated in the first information. The other coding parameters (secondary coding parameters) are selected by taking the index parameters that are in the neighborhood of the primary coding parameters. For example: the index parameters $[i(p)_k-\mu_k; i(p)_k+\mu_k]$ that are in the neighborhood of the $k^{th}$ primary coding parameter.

The management mode enabling such a selection is called "group" management mode. Thus, the information that can be included in the first information in order to implement such a selection is information indicating that "group" management mode is activated as well as the indices of the primary coding parameters and the associated $\mu_k$ values. This selection mode thus requires little signaling. To further reduce the signaling, it is possible to give the same value to all $\mu_k$.

Advantageously, the predefined list of coding parameters or the plurality of predefined lists are predefined lists of prediction modes or predefined lists of offset values of a filter.

Prediction modes can be understood to mean intra or inter modes making it possible to determine an element (in other words to determine the pixels of the element) of an image, based on other elements belonging to the same image for elements encoded in intra and based on elements of other images for elements encoded in inter.

The term offset value is understood to mean a value that can be added to each pixel of an element resulting from an intra or inter prediction, in order to correct errors that have arisen during encoding (in particular those relating to quantization).

A second aspect of the invention relates to a method for encoding a video bitstream corresponding to a sequence of images, which may comprise:
  determining an encoding parameterization, for an image in the sequence of images;
  determining a list of coding parameters on the basis of the encoding parameterization and of at least one predefined list of coding parameters;
  obtaining a video bitstream comprising:
    encoded data representative of first information, the first information indicating the encoding parameterization;
    encoded data representative of an element of the image, obtained by means of a coding parameter from the determined list of coding parameters, the encoded data representative of the element comprising encoded data representative of second information, the size of the encoded data representative of the second information depending on the number of coding parameters in the list of coding parameters.

As indicated above, the list of coding parameters may comprise a limited number of coding parameters, which allows reducing the size of the coding parameter signaling and reducing the amount of computation required to encode the elements of the image.

Encoding parameterization is understood to mean input data for the encoding. For example, the encoding parameterizations may be:
  instructions specifying the management modes to be used, the encoding characteristics of elements, and/or
  the management modes to be used, according to the encoding characteristics.

Video bitstream is understood to mean the bitstream resulting from encoding the sequence of images.

Encoded data representative of one or more elements is understood to mean the data comprised in a binary sequence and therefore in the video bitstream which are obtained by encoding said element or elements. These are data relating to an element of the image resulting from the video processing applied to the sequence of images. These encoded data include information on the basis of which the decoder will decode the sequence of encoded images in order to reconstruct the element of the image.

These encoded data are obtained from the element they represent (for example, to determine a residual), but also from other elements either from the image (Intra prediction) or from other images of the video stream (Inter prediction). In other words, the encoded data representative of a first element are obtained from a second element when the prediction mode (or more generally the coding parameter) used to encode the first element and which is signaled in the encoded data representative of the first element targets or indicates to use the second element (i.e. the values of the second element once decoded) to encode the first element.

The encoded data may include the second encoded information. The second data may correspond to the signaling of the coding parameter to be used for determining the element of the image to be reconstructed during decoding. For example, the second encoded data may include the index of the coding parameter to be used among the indices for the list of coding parameters, which is the same whether for the encoder or the decoder.

As an example, these representative encoded data may include the index of a prediction mode as well as a residual encoded after quantization and representing the difference between the values of a predictive element and the element of the image.

A third aspect of the invention relates to a computer program comprising instructions for implementing all or part of the methods described above, when this program is executed by a processor.

A fourth aspect of the invention relates to a device for decoding a video bitstream corresponding to a sequence of images, the device comprising:
  a processor; and
  a non-transitory computer medium comprising instructions which, when executed by the processor, configure the device for:
    obtaining first information from first encoded data contained in the bitstream;
    determining a list of coding parameters on the basis of the first information and of at least one predefined list of coding parameters;
    obtaining second information from second encoded data contained in the bitstream, the second information corresponding to a coding parameter among the coding parameters in the list of coding parameters;
    determining an element of a reconstructed image corresponding to an element of an image in the sequence of images, by means of said coding parameter corresponding to the second information and of encoded data representative of the element of the image in the sequence, and wherein the size of the second encoded data depends on the number of coding parameters in the list of coding parameters.

A fifth aspect of the invention relates to a device for encoding a video bitstream corresponding to a sequence of images, the device comprising:
  a processor; and
  a non-transitory computer medium comprising instructions which, when executed by the processor, configure the device for:

determining an encoding parameterization, for an image in the sequence of images;

determining a list of coding parameters on the basis of the encoding parameterization and of at least one predefined list of coding parameters;

obtaining a video bitstream comprising:

encoded data representative of first information, the first information indicating the encoding parameterization;

encoded data representative of an element of the image, obtained by means of a coding parameter from the determined list of coding parameters, the encoded data representative of the element comprising encoded data representative of second information, the size of the encoded data representative of the second information depending on the number of coding parameters in the list of coding parameters.

BRIEF DESCRIPTION OF DRAWINGS

Other features, details, and advantages will become apparent upon reading the detailed description below, and upon analyzing the accompanying drawings, in which:

FIG. 5 illustrates a non-limiting exemplary implementation of the proposed method when the management mode is "explicit".

FIG. 6a illustrates a non-limiting exemplary implementation of the proposed method when the management mode is "decimation".

DETAILED DESCRIPTION

Figure 1A:
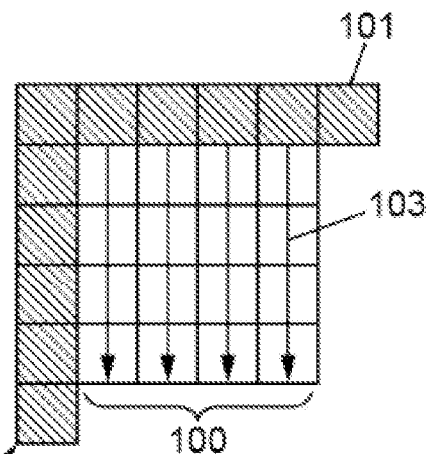
FIG. 1a illustrates an example of an element used for encoding or decoding an image according to one embodiment.

Embodiments of a computer-readable medium include, but are not limited to, computer storage media and communication media, including any medium facilitating the transfer of a computer program from one location to another. "Computer storage medium/media" is understood to mean any physical medium that can be accessed by a computer. Examples of computer storage media include, but are not limited to, flash memory drives or components or any other flash memory devices (e.g. USB keys, memory sticks, thumb drives, disks on key), CD-ROMs or other optical data storage devices, DVDs, magnetic disk data storage devices or other magnetic data storage devices, data memory components, RAM, ROM, EEPROM, memory cards ("smart cards"), SSD ("Solid State Drive") type memories, and any other form of medium that can be used to transport or store or save data or data structures readable by a computer processor.

In addition, various forms of computer-readable media can transmit or carry instructions to a computer, such as a router, a gateway, a server, or any data transmission device, whether by wired transmission (by coaxial cable, optical fiber, telephone wires, DSL cable, or Ethernet cable), wireless transmission (by infrared, radio, cellular, microwave), or virtualized transmission devices (virtual router, virtual gateway, virtual tunnel endpoint, virtual firewall). The instructions may, depending on the embodiments, comprise code in any computer programming language or computer program element, such as, without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "for example", "exemplary", "typically" are used in this description to denote examples or illustrations of non-limiting embodiments, which do not necessarily correspond to embodiments that are preferred or advantageous over other possible aspects or embodiments.

Video data are generally subject to source encoding intended to compress the data so as to reduce the resources required for its transmission and/or storage. There are many coding standards which can be used for this purpose, such as H.264/AVC, H.265/HEVC, MPEG-2, or the future VVC compression standard (h.266).

In conventional video compression schemes, the images of a video sequence or video stream are considered sequentially. Each image of the video sequence can be divided, for example, into a slice. These slices can represent a portion of the image. Slices can also be divided into elements of fixed size, for example 16×16, 32×32, 64×64, or 128×128 pixels, for the future VVC standard. For example, the elements can be macroblocks, CTUs (coding tree units), or CTBs (coding block units). Each element can be further divided into smaller elements of fixed size of 4×4, 8×8, 16×16, 32×32, 64×64, or 128×128 pixels. These elements of smaller size may be for example blocks, CUs (coding units), CBs (coding blocks), "prediction units" (PUs), "predict blocks" (PBs), "transform units" (TUs), or even "transform blocks" (TBs). One of the goals of partitioning the image into elements, which themselves can be divided into elements, is to allow adapting and refining the processing types to be applied to each element of the image.

Processing type is understood to mean one or more data processing operations performed on the video data during encoding or decoding. For example, when encoding an image, the elements of the image can be processed according to the processing type known as "intra prediction". This processing type allows predicting the elements, for example CUs or CBs, of an image to be encoded. Prediction aims to exploit the various correlations that exist between the pixels of images in a video sequence. This correlation can be spatial, known as "intra prediction", meaning between pixels of a same image currently being encoded, or it can be temporal, known as "inter prediction", meaning between the pixels of an image currently being encoded and the pixels of previously encoded images.

Neighboring pixels can be taken into account according to different configurations, and each configuration constitutes a specific coding parameter for the processing type known as "intra prediction" for example. Thus, this coding parameter can be a prediction mode in a certain direction.

For example, FIG. 1a illustrates an element 100, for example a CU or a PB or an MB, processed based on a processing type, for example an intra prediction, according to a given coding parameter, for example an intra prediction mode in a certain direction 103. According to this example, an element 100 of size 4×4 pixels can be surrounded by a set of already encoded (respectively decoded) pixels 101,102 belonging to the neighboring elements.

Figure 1B:
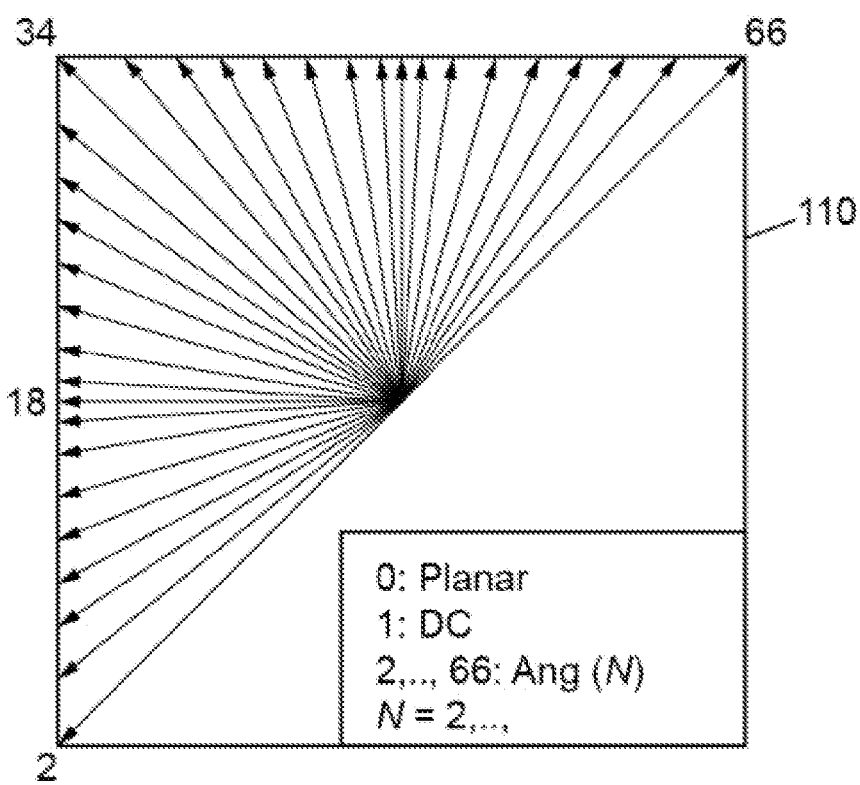
FIG. 1b illustrates an example of the number of angular intra prediction modes available for an encoder or decoder in an MPEG-type compression standard, for example the future VVC standard.

FIG. 1b illustrates an example of the coding parameters available for encoding elements in intra, and in particular for encoding element 100 in the case of the future VVC standard. A total of 67 coding parameters (not fully represented in FIG. 1a) may be available for the intra prediction of element 100.

Based on the coding parameters available for the processing type known as intra prediction, the encoder can select the optimal coding parameter (meaning the coding parameter which allows obtaining the predicted element 100 closest to the element of the image), and can predict the set of pixels of element 100 as a function of pixels 101, 102. For an intra prediction according to a vertical prediction mode 103, the pixels used can be the pixels in pixel row 101.

The predicted element 100 is then compared to the original element of the image being processed, to generate a residual representing the difference between the two elements. This residual can then be transformed, for example by DCT (discrete Fourier transform), then quantized before its encoding in the bitstream.

When decoding the intra-encoded element of an image to be reconstructed, the decoder reconstructs the predicted element with the same coding parameter used for the encoding of the element by the encoder and on the basis of the previously decoded pixels 101 and 102. In addition, the residual is added to the predicted element in order to bridge the existing differences between the predicted element and the original element. This operation can be repeated for all elements of each image in the video sequence.

According to another example, after encoding an element in intra or inter, an offset value can be added to a selection of an element, for example a CTU or CTB, during processing involving the application of an SAO filter. Indeed, after an intra or inter prediction followed by a quantization, the reconstructed element of the image being decoded may present distortions. To correct them, an offset value can be added to the value of each pixel in a selection of the element according to one of the SAO filter application modes (or SAO filter types). This value can be determined by the encoder during the encoding of the image in the sequence of images and then signaled in the bitstream, for example in the first syntactic element of each CTU for the HEVC standard or the future VVC standard. The signaling of this offset value can be done relative to a predefined list of offset values. The number of values may be different, depending on the compression standard. For example, in the case of the MPEG and VVC standards, when the pixel is encoded in 10 bits, the predefined list of offset values comprises 32 offset values. Thus, the cost of signaling the selection of an offset value among 32 offset values for each element can be relatively large. In 8 bits, this list comprises 8 values.

Thus, for each processing type used during video encoding or decoding, for example for an intra prediction, an inter prediction, or for the application of an SAO filter, a certain number of coding parameters can be associated with each of these processing types.

When encoding or decoding an element for example, depending on the processing type it may be necessary for the encoder or decoder to test all the coding parameters in order to determine the optimal coding parameter for a given processing type. The determination can be made on the basis of one or more metrics associated with this processing type. For example, when the processing type is an intra prediction, the metric is the amount of distortion combined with the signaling rate associated in a criterion known as the rate-distortion cost. Thus, the encoder selects the coding parameter offering the lowest rate-distortion cost for the element being processed, among all available intra prediction modes.

Certain types of mechanisms, for example for MPEG-type compression standards, allow reducing or eliminating the number of tests to be carried out for each coding parameter. Certain other types of mechanisms allow reducing the cost in signaling bits for each encoded element.

Despite the use of different types of mechanisms, these are insufficient, especially in a context of underuse of the set of coding parameters available, and all the more so for the new increasingly demanding applications. This is true whether the underuse is intentional due to a specific implementation, or linked to the content and a given operating point of the encoder.

Indeed, when encoding or decoding a video sequence, a compromise must be found between several aspects, for example such as bit rate, quality (distortion), encoding time, and energy consumption. This search for a compromise can depend on the application, for example the real-time encoding of a video stream (sports or live TV broadcast for example), or on the contrary on the encoding or decoding of a video sequence intended to be stored in external memories, or for example under a constraint of low consumption.

For example, from a rate-distortion or total rate cost point of view, having a high number of coding parameters per processing type can provide an overall gain in the encoding or decoding efficiency, but this gain may vary depending, for example, on the type of image (I, P, or B) or on the content of the images. Thus, in certain situations, a large number of coding parameters for a processing type can become counterproductive due to the irrelevance of a large portion of the possible coding parameters for a given image, considering the additional coding cost related to signaling a coding parameter among even more coding parameters.

From the point of view of encoding/decoding time and consumption of hardware resources as related to the compromise between bitrate and quality, the high number of coding parameters for a given processing type can become a very strong constraint on the implementation of a real-time encoder and decoder for example.

Figure 2:
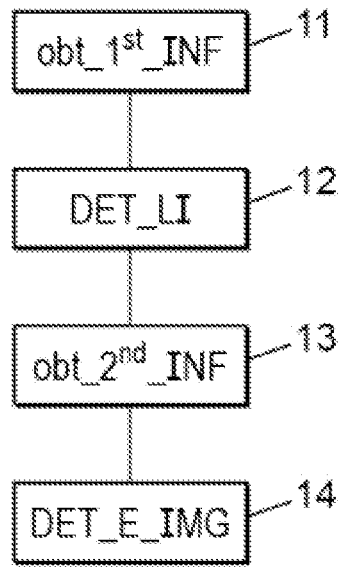
FIG. 2 illustrates the proposed decoding method according to one or more embodiments.

FIG. 2 illustrates the proposed method according to one or more embodiments. This method can be implemented by any device comprising a processor and a memory and configured for its implementation, for example such as a video decoder, or any device configured for decoding a video sequence.

In step 11, the device 500 obtains first information from first encoded data contained in the bitstream. This bitstream may be encoded according to MPEG-type standards for example, such as the HEVC standard or the future VVC standard. For example, the first information can be signaled in the signaling portion of the bitstream, for example the PPS. The first information encoded in the first data may be instructions intended for the decoder, defining the management modes enabling the determination of lists of coding parameters according to different selection rules. The first data may be signaled in the signaling portion of the bitstream, for example the PPS, or the "slice headers". This PPS field can contain initial information relating to one or more encoded images. Attaching multiple images to a single PPS containing the use of at least one list management mode can reduce the overall signaling cost.

As an example, upon decoding the first encoded data, the decoder can obtain an instruction for activating the method, for example "infra_adaptive_subset_enabled_flag", and upon decoding the instruction "infra_adaptive_subset_mode" can determine the management mode to be used. This management mode to be used can be the one that the encoder used to encode the elements of one or more images in the sequence of images.

According to one example, the instructions "intra_adaptive_subset_enabled_flag=1" and "intra_adaptive_subset_mode=2" indicate by the value 1 to the decoder to implement the method, and by the value 2 to use management mode number 2.

In step 12, the device 500 determines a list of coding parameters on the basis of the first information and at least one predefined list of coding parameters.

From, for example, the instructions defined by the first information encoded in the first encoded data which may be included in the signaling portion of the bitstream, the decoder can determine, according to a management mode, a list of coding parameters selected from a predefined list of coding parameters.

For example, the predefined list of coding parameters can be a list of prediction modes (intra or inter). In another example, the predefined list of coding parameters can be an "offset" list.

In step 13, the device obtains second information from second encoded data contained in the bitstream, the second information corresponding to a coding parameter among the coding parameters in the list of coding parameters.

Thus, as the list of coding parameters can be strictly included in the predefined list of coding parameters, the list of coding parameters can contain a reduced number of coding parameters. The signaling of a coding parameter, selected by the encoder, from the determined list of coding parameters can make it possible for the second data corresponding to the encoding of this signaling to be encoded in a reduced number of bits.

In step 14, the device determines an element of a reconstructed image corresponding to an element of an image in the sequence of images, by means of said coding parameter corresponding to the second information and of encoded data representative of the element of the image in the sequence.

Thus, the determination of an element of a reconstructed image carried out with a coding parameter contained in a restricted list of coding parameters can allow an optimization of the signaling cost, while maintaining relevant coding parameters in one or more lists of coding parameters.

The use of one or more lists of coding parameters for determining elements of a reconstructed image may be conditional on the encoding characteristics of the element of the image. The encoding characteristics can be the size of the elements, the type of intra and/or inter encoding, the quantization step size, etc. The encoding characteristics relating to the elements of one or more images may be included in the first information. When encoding the elements of the image, the encoder can encode the selected coding parameter enabling the determination of the element of the image reconstructed by the decoder.

When decoding the first data, the decoder can obtain the encoding characteristics of the image elements, and thus determine the lists of coding parameters specific to these encoding characteristics of the image elements. Depending on their encoding characteristics, the encoded image elements can be determined on the basis of one or more lists of coding parameters satisfying these characteristics.

For example, if the encoding characteristic is the pixel size of the element: when encoding an image, a first determined list of coding parameters can be used to encode an element having a size less than or equal to a first value, a second determined list of coding parameters can be used to encode an element having an element size greater than this first value.

It may also be possible to define a range of size values for each list of coding parameters. For example, a first list of coding parameters can be used for element sizes of the image that are 16×16 pixels, and the second list used for element sizes of the same image that are greater than 32×32 pixels.

The encoding characteristics of image elements may comprise chrominance characteristics or brightness characteristics of an element. Indeed, the pixels of each element of an image can be broken down into two components. A first component relating to the brightness characteristics is called "luma" and can define the brightness of the pixel. A second component relating to the chrominance characteristics called "chroma" can define the color of the pixel, conventionally composed of two components chroma U and chroma V. For example, for a same image, a first determined list of coding parameters can be used exclusively for the luma components, and a second determined list of coding parameters can be used exclusively for the chroma components.

Thus for an image element, the choice of a coding parameter, for example a prediction mode, whether for encoding or decoding the element of this image, is made according to a first list for chroma components and a second list for luma components.

The encoding characteristics of image elements may comprise quantization step sizes.

The encoding characteristics of image elements may comprise the type of encoding of the element or the type of encoding of the image to be encoded within a "group of pictures" (GOP). A first determined list of coding parameters can be used exclusively for intra type encoding of images, i.e. those for which the elements are encoded in intra. A second determined list of coding parameters can be used for exclusively predictive type (P) encoding of images, i.e. those for which the elements can be encoded in intra and in inter. A third list can be used for bi-predictive (B) type encoding of images, i.e. those for which the elements can be encoded in intra and in inter using several reference images.

According to another example, a same determined list of coding parameters can be used for encoding a same type of encoding of image elements not found in the same GOPs. For example: a same list of coding parameters used for two intra images respectively located in two separate GOPs.

Indeed, during the encoding of a video sequence, in current compression schemes for example of the MPEG type, the images processed according to one or more processing types associated with respective coding parameters are encoded within a group of images or "group of pictures" (GOP). The GOP defines the order in which intra (spatial) prediction images and inter (temporal) prediction images can be arranged. GOPs are key elements in compressing a video sequence, as they allow grouping the images that are dependent on each other.

Each GOP can contain, depending on the type of structure of the GOP, a succession of encoded images of the intra, predictive, and bidirectional type, and the first image of a GOP is generally an intra-type image in order allow starting up the GOP decoding. When decoding a GOP of a video sequence, each image is generated from the images encoded in that GOP.

Figure 3A:
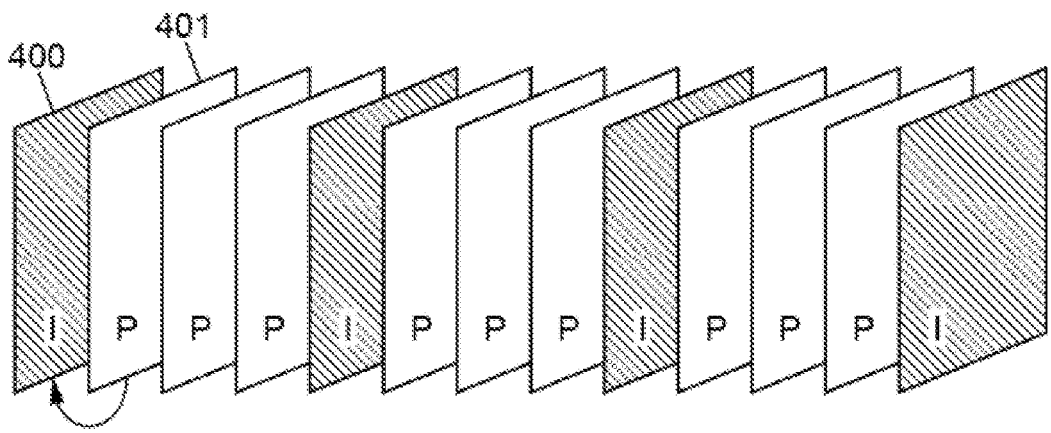
FIG. 3a illustrates an example of what is referred to as a "GOP" image grouping structure.
Figure 3B:
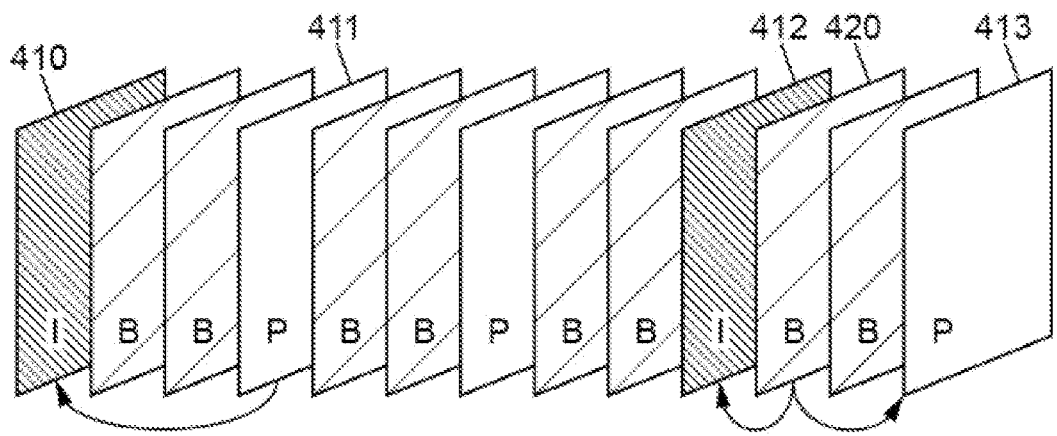
FIG. 3b illustrates another example of a "GOP" image grouping structure.

FIGS. 3a and 3b illustrate examples of two classic structures of a set of images or GOP ("group of pictures") constituting a video sequence to be encoded.

The first structure is an IP-type structure, i.e. an alternation of intra-type images and predictive-type images. Intra-type images are placed regularly, for example every 4 images in this case, in order to refresh the prediction and to allow access to the stream in particular. Thus, in this example, the predictive-type image 401 is predicted, according to inter prediction, based on the image data of the intra-type image 400, by means of motion compensation signaled by motion information based for example on a motion vector and a reference image.

The second GOP structure represented is an IBP structure, which is an alternation of intra-type images (I), predictive-type images (P), and bidirectional-type images (B). In this type of structure, the predictive-type image 411 is thus predicted from the image data of the intra-type image 410, and the bidirectional-type image 420 is predicted from the image data of the intra-type 412 and predictive-type 413 images, by means of motion compensation as above. This type of structure has the advantage of allowing bidirectional-type images (B) to use an inter prediction coming from two images of opposite temporal directions and thus to improve the efficiency of this prediction, and therefore the video data compression efficiency.

According to another example, not shown, a GOP can have a pyramidal type structure, where each image of the GOP is further defined by a hierarchical level or level or temporal_id.

When decoding the GOP, the decoder decodes the first data in the signaling portion, for example the PPS ("picture parameter set") of the bitstream, in order to obtain the first information enabling it to know the encoding characteristics of the elements of the image in the sequence of images, for example the GOP structure comprising an alternation of intra-type, predictive-type, or bidirectional-type images.

A first determined list of coding parameters may be used solely for encoding or decoding one or more intra-type images, and for an element size greater than a defined value. A second list of determined coding parameters may be used for type P or B images.

It is possible for the same coding parameter to belong to several lists of coding parameters.

Figure 4A:
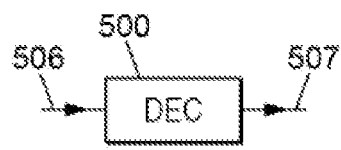
FIG. 4a illustrates an exemplary implementation of the proposed method according to one or more embodiments.

FIG. 4a shows a decoder implementing the method on the basis of an MPEG-type compression standard, for example HEVC or the future VVC standard.

Upon receipt of a bitstream 506 generated by an encoder implementing the method, the decoder 500 decodes first data relating to first information, for example instructions corresponding to one or more management modes for the determination of one or more lists of coding parameters. These instructions, defined for example in the PPS or the "slice headers", can be used for determining elements of an image, or for a set of images in the sequence of images, for example a GOP or images presenting the same encoding characteristics of image elements.

Thus, from the instructions defined in the first information, the decoder 500 determines one or more lists of coding parameters on the basis of one or more predefined lists of coding parameters that the decoder has in its memory. These determined lists of coding parameters are identical to those determined by the encoder for encoding the elements of images in the image sequence. Indeed, from the first information, the decoder can deduce the encoder configuration, and thus the various management modes that can be used.

When the decoder decodes an element, it determines the encoding characteristics of that element in order to deduce the determined list to be used among the determined lists. Then it decodes the second data relating to the second information. This second information provides information about the index of the coding parameter to be used from the determined list of coding parameters to be used, for determining the element to be decoded. This process can be repeated for all elements of the images in the sequence of images, to generate a sequence of images as output 507.

In the case where the coding parameters are intra prediction modes for an image to be decoded, based on the first data encoded in the bitstream 506 the decoder determines one or more lists of intra prediction modes which are identical to those used for encoding this image. A list can be determined for use for the determination of image elements encoded according to intra-type characteristics, i.e. elements of an intra-type image, and for elements of size 16×16 pixels, then an element encoded according to these characteristics, i.e. encoded in an intra-type image (or intra image) and having a pixel size of 16×16 pixels, can then be predicted (determined) on the basis of this list of prediction modes. From the second encoded information, the decoder identifies the index, in the determined list, for the coding parameter to be used for decoding the element to be decoded.

Figure 4B:
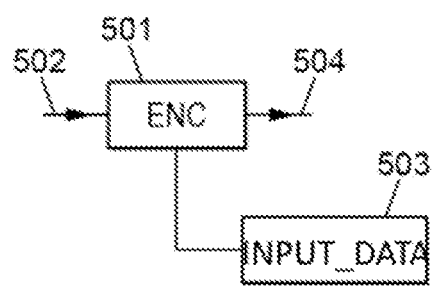
FIG. 4b illustrates an exemplary implementation of the proposed method according to one or more embodiments.

FIG. 4b illustrates an implementation of the method in one or more embodiments, on the encoder side. Thus, an encoder 501 receives a sequence of images 502 to be encoded. The encoder also receives input data 503 allowing the configuration of the encoding. These input data may contain instructions, which among other things may indicate the implementation of the method, the management mode to be used, the encoding characteristics of image elements, and/or the use of lists of coding parameters as a function of the encoding characteristics.

During the encoding process, the encoder 501 can then generate a bitstream comprising the encoded image elements 504. The bitstream 504 may also comprise the input data which were used for encoding the image elements and which can allow the decoder to decode them correctly. These input data may be encoded in the first data located in the signaling portion of the bitstream, for example PPS.

In addition, the indices of the coding parameters used for encoding the image elements may be signaled by encoding in the second data located in the signaling portion of the bitstream 504.

Obtaining a predictive element by means of the optimal or relevant coding parameter makes calculation possible as described above for the calculation of a residual, which can then be transformed, for example by DCT, then quantized according to a quantization step size. After quantization, the data from the encoding can be encoded in the bitstream 504.

Figures 5, 6A:
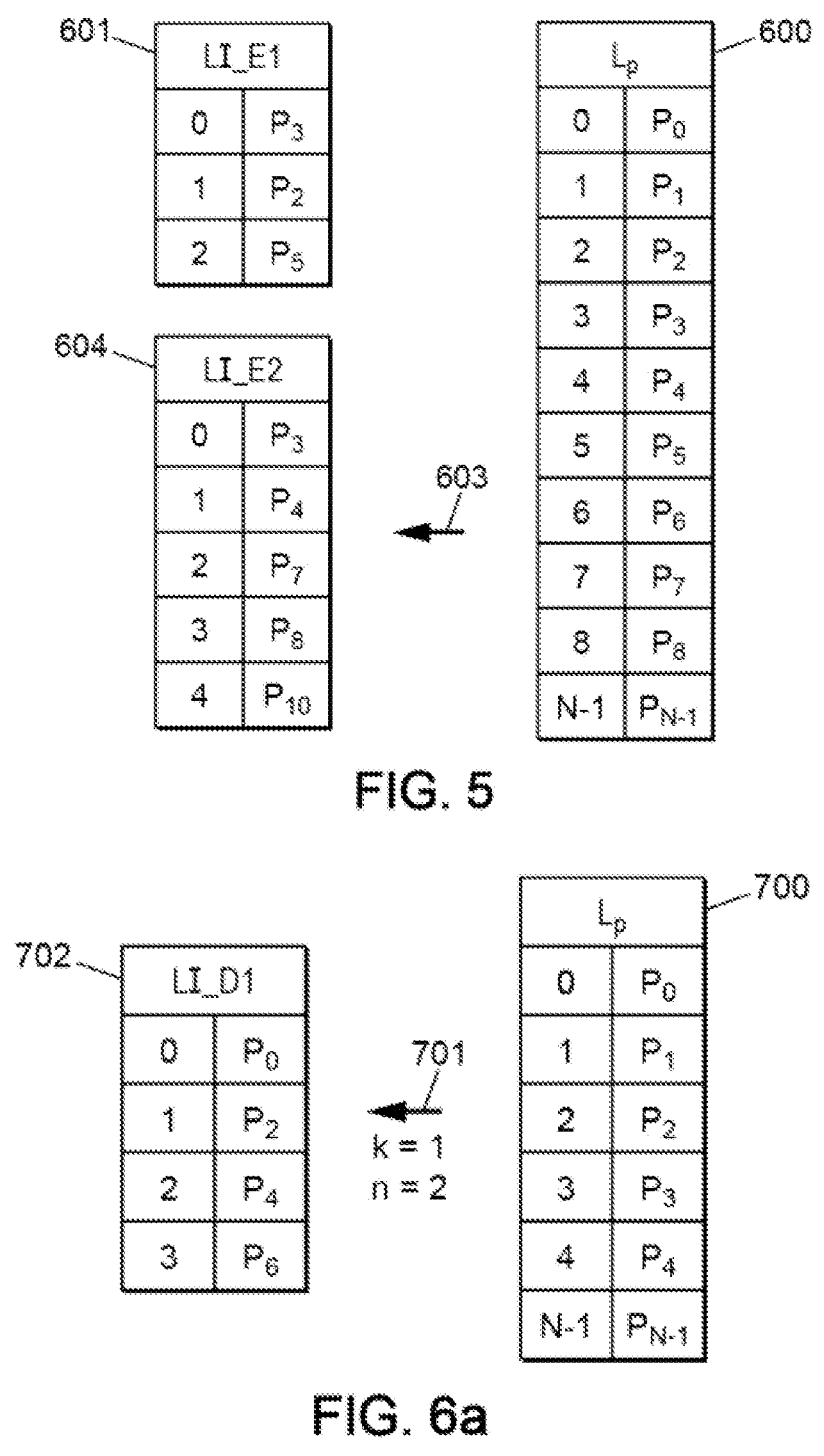

FIG. 5 illustrates an example of a management mode implemented by the method for determining an element of an image being encoded or decoded. Thus, when the management mode is what is referred to as "explicit" management mode, the decoder 500 determines, from the instructions contained in the first information defining this management mode, one or more lists of coding parameters. The instructions may for example explicitly list a first set of coding parameter indices. A second list may explicitly list a second set of coding parameter indices. A third list may explicitly list a third set of coding parameter indices, etc. The instructions may, in addition, specify encoding characteristics of elements for which these predefined lists of coding parameter indices are to be used.

Upon reading the instructions defining the first set of coding parameter indices, and based on the predefined list 600 of coding parameters $L_P$ comprising N−1 coding parameters, the decoder 500 determines 603 the first list LI_E1 by selecting coding parameters according to the indices defined in the first set of indices. Here, three coding parameter indices are defined in the instructions for the first list. The indices may refer to the predefined list $L_P$ 600. For example: index 3 for coding parameter $p_3$, index 2 for coding parameter $p_2$, and index 5 for coding parameter $p_5$. Thus, the first indexed list LI_E1 601 can be determined 603, comprising a first index 0 corresponding to coding parameter $p_3$, an index 1 corresponding to coding parameter $p_2$, and an index 2 corresponding to coding parameter $p_5$.

Based on the instructions comprised in the first information, the decoder 500 can determine 603 a second indexed list of coding parameters LI_E2 604 on the basis of the predefined list $L_P$ 600. For example, the instructions can define a second set of coding parameter indices comprising 5 coding parameters $p_3$, $p_4$, $p_7$, $p_8$, $p_{10}$ respectively associated with indices 3, 4, 7, 8, and 10 in the predefined list of coding parameters. From these instructions, the decoder 500 can determine an indexed list LI_E2 comprising the coding parameters $p_3$, $p_4$, $p_7$, $p_8$, $p_{10}$ respectively associated with indices 0, 1, 2, 3, 4.

The use of the first and/or second list for determining the elements of the image to be reconstructed may depend on the encoding characteristics of the elements of the image which can be signaled in the instructions comprised in the first information. For example, the first list LI_E1 can be used for the determination of elements encoded in intra (spatial prediction), and the second list LI_E2 can be used for the determination of elements encoded in inter (temporal prediction) (in particular for example when the coding parameters are what are referred to as "offset" values.

The determination of a plurality of determined lists of coding parameters can, by constraining their use to the encoding characteristics of image elements, allow great adaptability of the possible coding parameters for encoding elements of an image in a sequence of images while maintaining a low signaling cost.

FIG. 6a illustrates an example of a "Decimation" management mode for coding parameters. The decoder 500 determines at least one indexed list 702 by selecting coding parameters from the predefined lists of coding parameters 700 (for example a list of 67 intra prediction modes).

From the information comprised in the first information, the decoder 500 obtains information about the fact that "decimation" management mode is activated and about the values of the selection offset parameters k and the decimation factor n. As indicated above, this information enables the decoder 500 to determine a list of coding parameters by selecting indices k+n·m from a predefined list of coding parameters. The information may also comprise, in addition to or instead of k and n, a hierarchical level of the image to be decoded in the structure of the GOP, defined by an integer L. In the case of FIG. 6a, the value of n is equal to 2 and the value of k is equal to 1.

Thus the decoder 500 determines the list LI_D1 indexed according to a new indexing 702 and where each index of this list LI_D1 is associated with a coding parameter obtained by selecting every other coding parameter in the predefined list of coding parameters 700.

Next, when decoding the elements of the image, the decoder 500 can use the lists determined by decimation, on the basis of the encoding characteristics of the element being decoded. For example, a first list 702 can be used exclusively for decoding elements having a certain level of brightness and comprised in intra-type images. A second indexed list (not shown) can be used exclusively for decoding elements having an element size greater than a value (for example greater than 8×8 pixels), comprised in type B or type P images.

When the first information comprises a hierarchical level L, decimation is performed only for images below (or above) a certain hierarchical level. It is also possible to define several hierarchical levels with, for each level, specific values of k and n. When the value L is comprised in the first information, the values k and n can be implicit, meaning that on the basis of the value L, the decoder 500 deduces a k, n pair without these being comprised in the first information.

Figure 6B:
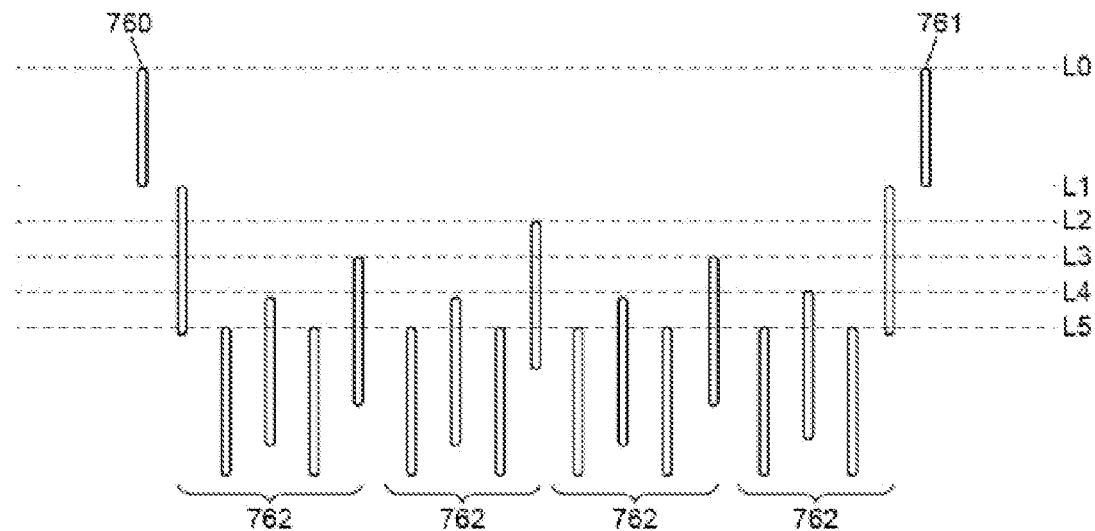
FIG. 6b illustrates a non-limiting exemplary implementation of the proposed method when the management mode is "decimation".

FIG. 6b illustrates hierarchical levels in a GOP structure comprising 19 images 760, 761, 762. Here, the structure of the GOP comprises several hierarchical levels L0 to L5.

For each value of the hierarchical level L, the selection by decimation can allow for different values of k and n (for example the pairs (1; 2), (1; 4), and (1; 8)). The determined lists are then used for decoding the elements of each image of the GOP according to the hierarchical level L1 to L5 of the image in which the element to be decoded is located (for example the list obtained with the pair (1; 2) can be used for images of hierarchical levels L3 to L5, the list obtained with the pair (1; 4) can be used for images of hierarchical level L2, and the list obtained with the pair (1; 8) can be used for images of hierarchical level L1, the predefined list being used for images of hierarchical level L0.

The lists obtained by decimation may be used solely for decoding images of the same type. For example, with reference to FIG. 6b, only B type images 762 can be decoded on the basis of lists obtained by decimation, if we consider that image 760 is an intra-type image and that image 761 is a predictive-type image.

Depending on the first information, the decimation may be carried out on only part of the predefined list. For example, when the coding parameters are intra prediction modes, the decimation may be performed only on the angular modes. The first information may then contain additional information, for example the indices of the coding parameters to be retained before carrying out the decimation. It is also possible to define a value of k sufficient to spare the first coding parameters in the predetermined list.

For example, the first determined list LI_D1 then comprises 35 prediction modes. Indeed, this first list comprises 2 non-angular modes, namely DC and Planar, for 65 angular modes. The list LI_D1 then comprises the two non-angular modes and the angular modes resulting from the selection by decimation, i.e. after selection of a total of 33 angular modes.

Figure 7:
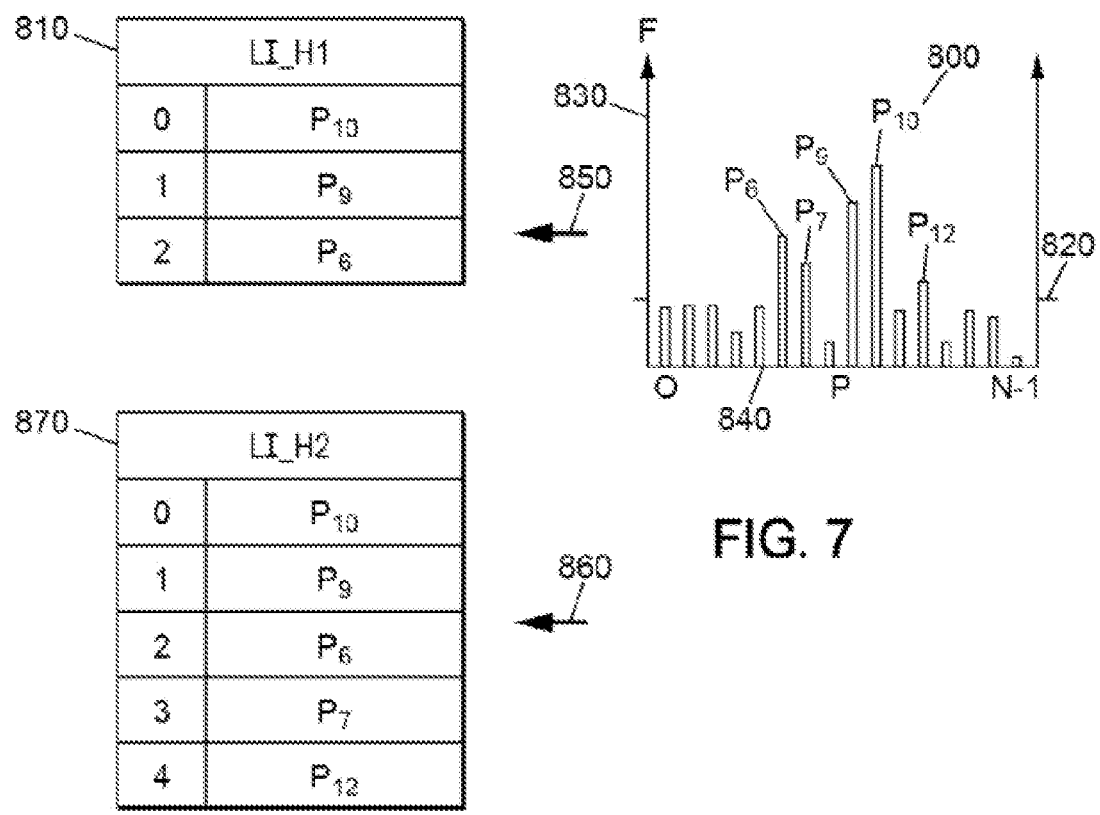
FIG. 7 illustrates non-limiting exemplary implementations of the proposed method when the management mode is "histogram".

FIG. 7 illustrates an example of another management mode implemented by the method. Thus, when the management mode is a "Histogram" management mode, the decoder 500 determines 850 at least one indexed list 810 or 870 as a function of the level of frequency of use of the coding parameters in the predefined list of coding parameters. This frequency of use may for example be representative of the use of a coding parameter to determine the elements of previous images and/or of the image being decoded. According to one example, the frequency of use of each coding parameter in a predefined list can be represented in the form of a histogram.

Thus, with reference to FIG. 7, a histogram 800 can be defined by an x-axis 840 of coding parameters, and a y-axis 830 indicating the frequency of use, for example in percentages.

The list of coding parameters can be determined from a selection of coding parameters having a frequency of use obeying selection rules.

The selection rules for this management mode may be defined for example by a selection factor h, and/or a selection threshold S. These selection parameters may be comprised in the first information enabling the decoder 500 to define the management mode.

Thus, the selection rules may be the selection of h coding parameters among the coding parameters of the histogram (h being a positive integer) having the highest frequencies of use. The determined list of coding parameters may for example include a ranking of the frequency of use, in descending or ascending order. For example, according to histogram 800, when the factor h is equal to 3, the determined list LI_H1 810 of coding parameters 850 includes the three coding parameters $p_{10}$, $p_9$, and $p_6$ having the highest frequencies of use among the coding parameters in the predefined list. This list is reordered so that index 0 is associated with coding parameter $p_{10}$, index 1 is associated with coding parameter $p_9$, and index 2 is associated with coding parameter $p_6$.

The first information can then comprise information about the fact that the "histogram" management mode is activated and the factor h.

The selection rules may also be the selection of coding parameters having frequencies of use greater than a threshold "S" 820. The determined list of coding parameters may for example comprise a ranking of the frequency of use, in decreasing or increasing order. For example, according to the histogram 800 with its threshold S 820, the list LI_H2 870 of coding parameters which comprises coding parameters $p_6$, $p_7$, $p_9$, $p_{10}$, and $p_{12}$ presenting the highest frequencies of use among the coding parameters of the predefined list is determined 860. This list is reordered so that index 0 is associated with coding parameter $p_{10}$, index 1 is associated with coding parameter $p_9$, index 2 is associated with coding parameter $p_6$, index 3 is associated with coding parameter $p_7$, and index 4 is associated with coding parameter $p_{12}$.

The first information can then comprise information about the fact that the "histogram" management mode is activated and the selection threshold "S".

It may be possible to combine the selection parameters. Thus, following the instructions defined in the configuration of the "histogram" management mode, it may be possible, for example, to apply a selection threshold followed by a selection factor.

Figures 8, 9:
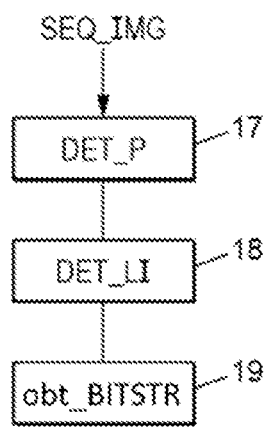
FIG. 8 illustrates a non-limiting exemplary implementation of the proposed method when the management mode is "group".
FIG. 9 illustrates the proposed encoding method according to one or more embodiments.

FIG. 8 illustrates an example of another management mode implemented by the method. When the management mode is a management mode called "group" for example, the decoder 500 determines 901 at least one list of indexed coding parameters 902 comprising one or more of what are termed primary coding parameters surrounded by what are termed secondary coding parameters according to the set $U_k[i(p)_k - \mu_k; i(p)_k + \mu_k]$ where $i(p)k$ are the indices of the primary coding parameters and $\mu_k$ (offset factor) are strictly positive integers specified for example in the instructions of the "group" management mode comprised in the first information.

For example, in FIG. 8, the first information contains three primary encoding parameters ($p_2$, $p_7$, and $p_i$) and an offset factor (d) of 1. Based on these instructions, the decoder 500 determines the list 902. This contains the explicitly signaled primary coding parameters and the secondary coding parameters which are then $p_1$, $p_3$, $p_6$, $p_8$, $p_{i-1}$ and $p_{i+1}$.

FIG. 9 illustrates the proposed method according to one or more embodiments. This method can be implemented by any device comprising a processor and a memory and configured for its implementation, for example such as a video encoder 501, or any device configured for encoding a video sequence.

In step 17, the device 501 determines an encoding parameterization for an image in the sequence of images (video sequence). For example, the encoding parameterization can be input data for the encoding, for example such as instructions specifying the management modes to be used, the encoding characteristics of elements, and/or the management modes to be used depending on the encoding characteristics.

In step 18, the device 501 determines a list of coding parameters. The determination of the list of coding parameters can be carried out according to one of the previously indicated methods, for example by "decimation", by "histogram", by explicit selection, or by "group". These various methods can also be combined, i.e. a first method (among its methods) is applied in order to select a first list of coding parameters from the predefined list of coding parameters, and a second method (among its methods) is applied in order to select a second list of coding parameters from this first list of coding parameters.

In step 19, the device 501 obtains a bitstream comprising first information as well as encoded data representative of the elements of the image.

The first information may for example indicate the parameterization used for encoding the image from the sequence of images.

Second information may be comprised in the encoded data representative of the elements. This second information indicates the coding parameter used from the determined list in order to obtain an element of the image.

Figure 10:
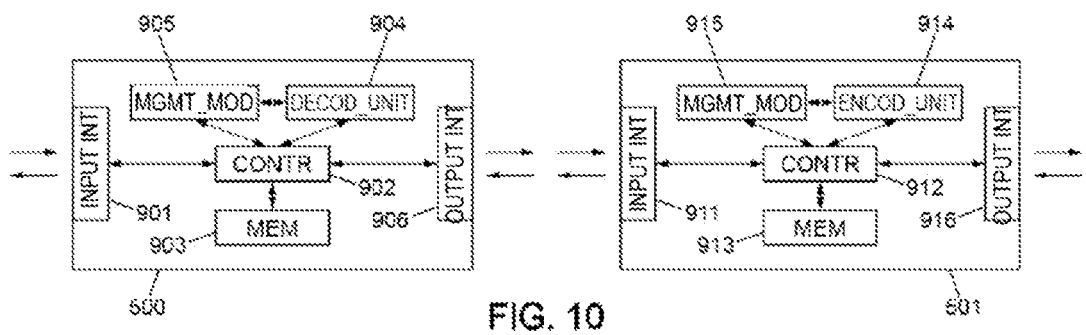
FIG. 10 illustrates an exemplary device for encoding and an exemplary device for decoding a sequence of images, for the implementation of the proposed method.

FIG. 10 illustrates an exemplary architecture of a video sequence decoding device and an exemplary architecture of a video sequence encoding device for implementing the proposed method.

The device 500 comprises a controller 902, operatively coupled to an input interface 901, to an output interface 906, and to a memory 903, which controls a coding parameters management module 905 and a decoding unit 904 for decoding images of a video sequence.

The input interface 901 is configured to receive as input a bitstream corresponding to a sequence of images, encoded for example according to the method, in a bitstream.

The controller 902 is configured to control the coding parameters management module 905 and the decoding unit 904 in order to implement one or more embodiments of the proposed method.

The coding parameters management module 905 can be configured to implement one or more embodiments of the proposed method for determining and using lists of coding parameters. In particular, it can be configured to receive, at the input interface, a bitstream encoded according to the method and comprising first and second encoded data. Upon decoding this bitstream, the management mode can be configured to obtain first information from first encoded data contained in the bitstream, for determining a list of coding parameters on the basis of the first information and at least one predefined list of coding parameters. The coding parameters management module 905 can further be configured to obtain second information from second encoded data contained in the bitstream, the second information corresponding to a coding parameter among the coding parameters in the list of coding parameters. The memory 903 can be configured to store information signaled in the bitstream, such as first and second information decoded from the first and second encoded data.

The decoding unit 904, via the management module, can be configured to determine an element of a reconstructed image corresponding to an element of an image in the sequence of images by means of a coding parameter corresponding to the second information and of encoded data representative of the element of the image in the sequence, and in which the size of the second encoded data depends on the number of coding parameters in the list of coding parameters.

The device 500 may be configured to output 906 a decoded video data stream, for example a sequence of images.

The device 500 may be a computer, a computer network, an electronic component, or other device comprising a processor operatively coupled to a memory, as well as, depending on the chosen embodiment, a data storage unit, and other associated hardware elements such as a network interface and a media drive for reading from and writing to a removable storage medium (not shown in FIG. 10). The removable storage medium may be, for example, a compact disc (CD), a digital video/versatile disc (DVD), a flash drive, a USB stick, etc. Depending on the embodiment, the memory, data storage unit, or removable storage medium contains instructions which, when executed by the controller 902, cause the controller 902 to perform or control the input interface 901, coding parameters management module 905, image decoding, and/or data processing portions of the exemplary implementations of the proposed method described herein. The controller 902 may be a component implementing a processor or a calculation unit for decoding one or more images in a sequence of images on the basis of at least one list of coding parameters according to the proposed method, and for controlling units 901, 902, 903, 904, 905, 906 of the device 500.

Furthermore, the device 500 may be implemented in software form, as described above, or in hardware form, such as an application specific integrated circuit (ASIC), or in a combination of hardware and software components, for example a software program intended to be loaded and executed on an FPGA (Field Programmable Gate Array) type of component.

Device 501 comprises a controller 912, operatively coupled to an input interface 911, an output interface 916, and a memory 913, which controls a coding parameters management module 915 and an encoding unit 914 for encoding images in a sequence of images.

The input interface 911 is configured to receive as input a sequence of images corresponding, for example, to a video sequence or a live video stream.

The controller 912 is configured to control the coding parameters management module 915 and the encoding unit 914 in order to implement one or more embodiments of the proposed method.

The coding parameters management module 915 can be configured to implement one or more embodiments of the proposed method for determining and using lists of coding parameters. In particular, it can be configured, for an image in the sequence of images, to determine an encoding parameterization, for example based on the input interface. The coding parameters management module 915 can further be configured to determine a list of coding parameters on the basis of the encoding parameterization and of at least one predefined list of coding parameters.

The input interface is configured to receive input data as well, comprising for example an encoding parameterization for the sequence of images, for example instructions, which among other things can signal the implementation of the method, the management mode to be used, the encoding characteristics of elements of images in the sequence of images, and the manner in which the use of the lists of coding parameters for the management modes can be dependent on these encoding characteristics.

The memory 913 can be configured to store input information, such as input data.

The encoding unit 914 can be configured to obtain a video bitstream comprising encoded data representative of first information, the first information indicating the encoding parameterization, as well as encoded data representative of an element of the image which are obtained by means of a coding parameter from the determined list of coding parameters, the encoded data representative of the element comprising encoded data representative of second information, the size of the encoded data representative of the second information depending on the number of coding parameters in the list of coding parameters, the bitstream obtained being able to be sent to device 500 for example.

Device 501 may be a computer, a computer network, an electronic component, or other device comprising a processor operatively coupled to a memory, as well as, depending on the chosen embodiment, a data storage unit, and other associated hardware elements such as a network interface and a media drive for reading from and writing to a removable storage medium (not shown in FIG. 10). The removable storage medium may be, for example, a compact disc (CD), a digital video/versatile disc (DVD), a flash drive, a USB stick, etc. Depending on the embodiment, the memory, data storage unit, or removable storage medium contains instructions which, when executed by the controller 912, cause the controller 912 to perform or control the input interface 911, coding parameters management module 915, image encoding, and/or data processing portions of the exemplary implementations of the proposed method described herein. The controller 912 may be a component implementing a processor or a calculation unit for encoding one or more images of a video sequence on the basis of at least one list of coding parameters according to the proposed method, and for controlling units 911, 912, 913, 914, 915, 916 of device 501.

Furthermore, device 501 may be implemented in software form, as described above, or in hardware form, such as an application specific integrated circuit (ASIC), or in a combination of hardware and software components, for example a software program intended to be loaded and executed on an FPGA (Field Programmable Gate Array) type of component.

The method is not limited to the exemplary embodiments described above solely as examples, but encompasses all variants conceivable to a person skilled in the art in the context of the claims below.

The invention claimed is:

1. A method for decoding a video bitstream corresponding to a sequence of images, the method comprising:
obtaining first information from first encoded data contained in the bitstream;
determining a list of coding parameters on the basis of the first information and of at least one predefined list of coding parameters;
obtaining second information from second encoded data contained in the bitstream, the second information corresponding to a coding parameter among the coding parameters in the list of coding parameters;
determining an element of a reconstructed image corresponding to an element of an image in the sequence of images, by means of said coding parameter corresponding to the second information and of encoded data representative of the element of the image in the sequence;
wherein the size of the second encoded data depends on the number of coding parameters in the list of coding parameters;
wherein the predefined list of coding parameters is indexed from 0 to N−1, with N being the number of coding parameters in the predefined list, and wherein the determination of the list of coding parameters is done by selecting, on the basis of the first information:
coding parameters of indices k+n.m in the predefined list, with n a strictly positive integer and k a positive integer or zero and n+k less than or equal to N−1, and m between 0 and the integer part of (N−k−1)/n; and
coding parameters of indices strictly less than k' in the predefined list, with k' being a positive integer or zero and less than or equal to k.

2. The method according to claim 1, wherein n and m are determined as a function of a hierarchical level of the image relative to the images in the sequence of images.

3. The method according to claim 1, wherein the list of coding parameters is determined by selecting coding parameters from the predefined list of coding parameters or by selecting among a plurality of predefined lists of coding parameters.

4. The method according to claim 1, wherein the first encoded data and/or the second encoded data are comprised in a signaling portion of the bitstream.

5. The method according to claim 1, wherein the list of coding parameters is a function of the encoding characteristics of elements of the image.

6. The method according to claim 5, wherein the encoding characteristics of elements of the image comprise an element size and/or an element quantization step size and/or an element chrominance type and/or an element brightness type and/or an element intra encoding type and/or an element inter encoding type and/or a transform size and/or a transform type and/or a filter type.

7. The method according to claim 1, wherein the determination of the list of coding parameters is done by selecting, from the predefined list of coding parameters, coding parameters specified by the first information.

8. The method according to claim 1, wherein the predefined list of coding parameters or the plurality of predefined lists are predefined lists of prediction modes or predefined lists of adaptive offset values of a filter.

9. A method for decoding a video bitstream corresponding to a sequence of images, the method comprising:
obtaining first information from first encoded data contained in the bitstream;
determining a list of coding parameters on the basis of the first information and of at least one predefined list of coding parameters;
obtaining second information from second encoded data contained in the bitstream, the second information corresponding to a coding parameter among the coding parameters in the list of coding parameters;
determining an element of a reconstructed image corresponding to an element of an image in the sequence of images, by means of said coding parameter corresponding to the second information and of encoded data representative of the element of the image in the sequence;
wherein the size of the second encoded data depends on the number of coding parameters in the list of coding parameters;
wherein the determination of the list of coding parameters is done by selecting the coding parameters from the predefined list, on the basis of the first information, as a function of the levels of frequency of use of the coding parameters of the predefined list.

10. A method for decoding a video bitstream corresponding to a sequence of images, the method comprising:
obtaining first information from first encoded data contained in the bitstream;
determining a list of coding parameters on the basis of the first information and of at least one predefined list of coding parameters;
obtaining second information from second encoded data contained in the bitstream, the second information corresponding to a coding parameter among the coding parameters in the list of coding parameters;
determining an element of a reconstructed image corresponding to an element of an image in the sequence of images, by means of said coding parameter corresponding to the second information and of encoded data representative of the element of the image in the sequence;
wherein the size of the second encoded data depends on the number of coding parameters in the list of coding parameters;
wherein the predefined list of coding parameters is indexed and wherein the determination of the list of coding parameters is done by selecting, on the basis of the first information:
primary coding parameters specified by the first information; and
secondary coding parameters such that an index of each secondary coding parameter is comprised in $U_k[l(P)_k - \mu_k; l(p)_k + \mu_k]$ where i(p)k are the indices of the primary coding parameters and $\mu_k$ are strictly positive integers specified by the first information.

11. A method for encoding a video bitstream corresponding to a sequence of images, the method comprising:
determining an encoding parameterization, for an image in the sequence of images;
determining a list of coding parameters on the basis of the encoding parameterization and of at least one predefined list of coding parameters;
obtaining a video bitstream comprising:

encoded data representative of first information, the first information indicating the encoding parameterization;

encoded data representative of an element of the image, obtained by means of a coding parameter from the determined list of coding parameters, the encoded data representative of the element comprising encoded data representative of second information, the size of the encoded data representative of the second information depending on the number of coding parameters in the list of coding parameters;

wherein the predefined list of coding parameters is indexed from 0 to N−1, with N being the number of coding parameters in the predefined list, and wherein the determination of the list of coding parameters is done by selecting, on the basis of the first information:

coding parameters of indices k+n.m in the predefined list, with n a strictly positive integer and k a positive integer or zero and n+k less than or equal to N−1, and m between 0 and the integer part of (N−k−1)/n; and coding parameters of indices strictly less than k' in the predefined list, with k' being a positive integer or zero and less than or equal to k.

12. A method for encoding a video bitstream corresponding to a sequence of images, the method comprising:

determining an encoding parameterization, for an image in the sequence of images;

determining a list of coding parameters on the basis of the encoding parameterization and of at least one predefined list of coding parameters;

obtaining a video bitstream comprising:

encoded data representative of first information, the first information indicating the encoding parameterization;

encoded data representative of an element of the image, obtained by means of a coding parameter from the determined list of coding parameters, the encoded data representative of the element comprising encoded data representative of second information, the size of the encoded data representative of the second information depending on the number of coding parameters in the list of coding parameters;

wherein the determination of the list of coding parameters is done by selecting the coding parameters from the predefined list, on the basis of the first information, as a function of the levels of frequency of use of the coding parameters of the predefined list.

13. A method for encoding a video bitstream corresponding to a sequence of images, the method comprising:

determining an encoding parameterization, for an image in the sequence of images;

determining a list of coding parameters on the basis of the encoding parameterization and of at least one predefined list of coding parameters;

obtaining a video bitstream comprising:

encoded data representative of first information, the first information indicating the encoding parameterization;

encoded data representative of an element of the image, obtained by means of a coding parameter from the determined list of coding parameters, the encoded data representative of the element comprising encoded data representative of second information, the size of the encoded data representative of the second information depending on the number of coding parameters in the list of coding parameters;

wherein the predefined list of coding parameters is indexed and wherein the determination of the list of coding parameters is done by selecting, on the basis of the first information:

primary coding parameters specified by the first information; and secondary coding parameters such that an index of each secondary coding parameter is comprised in $U_k[l(P)_k - \mu_k; i(p)_k + \mu_k]$ where $i(p)k$ are the indices of the primary coding parameters and u are strictly positive integers specified by the first information.

14. A computer program stored on a non-transitory computer-readable medium and comprising instructions for implementing the method according to claim 1, when this program is executed by a processor.

15. A device for decoding a video bitstream corresponding to a sequence of images, the device comprising:

a processor; and a non-transitory computer medium comprising instructions which, when executed by the processor, configure the device for:

obtaining first information from first encoded data contained in the bitstream;

determining a list of coding parameters on the basis of the first information and of at least one predefined list of coding parameters;

obtaining second information from second encoded data contained in the bitstream, the second information corresponding to a coding parameter among the coding parameters in the list of coding parameters;

determining an element of a reconstructed image corresponding to an element of an image in the sequence of images, by means of said coding parameter corresponding to the second information and of encoded data representative of the element of the image in the sequence;

wherein the size of the second encoded data depends on the number of coding parameters in the list of coding parameters;

wherein the predefined list of coding parameters is indexed from 0 to N−1, with N being the number of coding parameters in the predefined list, and wherein the determination of the list of coding parameters is done by selecting, on the basis of the first information:

coding parameters of indices k+n.m in the predefined list, with n a strictly positive integer and k a positive integer or zero and n+k less than or equal to N−1, and m between 0 and the integer part of (N−k−1)/n; and coding parameters of indices strictly less than k' in the predefined list, with k' being a positive integer or zero and less than or equal to k.

16. A device for decoding a video bitstream corresponding to a sequence of images, the device comprising:

a processor; and a non-transitory computer medium comprising instructions which, when executed by the processor, configure the device for:

obtaining first information from first encoded data contained in the bitstream;

determining a list of coding parameters on the basis of the first information and of at least one predefined list of coding parameters;

obtaining second information from second encoded data contained in the bitstream, the second information corresponding to a coding parameter among the coding parameters in the list of coding parameters;

determining an element of a reconstructed image corresponding to an element of an image in the sequence of images, by means of said coding parameter corresponding to the second information and of encoded data representative of the element of the image in the sequence;

wherein the size of the second encoded data depends on the number of coding parameters in the list of coding parameters;

wherein the determination of the list of coding parameters is done by selecting the coding parameters from the predefined list, on the basis of the first information, as a function of the levels of frequency of use of the coding parameters of the predefined list.

17. A device for decoding a video bitstream corresponding to a sequence of images, the device comprising:
a processor; and
a non-transitory computer medium comprising instructions which, when executed by the processor, configure the device for:
obtaining first information from first encoded data contained in the bitstream;
determining a list of coding parameters on the basis of the first information and of at least one predefined list of coding parameters;
obtaining second information from second encoded data contained in the bitstream, the second information corresponding to a coding parameter among the coding parameters in the list of coding parameters;
determining an element of a reconstructed image corresponding to an element of an image in the sequence of images, by means of said coding parameter corresponding to the second information and of encoded data representative of the element of the image in the sequence;
wherein the size of the second encoded data depends on the number of coding parameters in the list of coding parameters;
wherein the predefined list of coding parameters is indexed and wherein the determination of the list of coding parameters is done by selecting, on the basis of the first information:
primary coding parameters specified by the first information; and
secondary coding parameters such that an index of each secondary coding parameter is comprised in $U_k[l(p)_k - \mu_k; l(p)_k + \mu_k]$ where $i(p)k$ are the indices of the primary coding parameters and $\mu_k$ are strictly positive integers specified by the first information.

18. A device for encoding a video bitstream corresponding to a sequence of images, the device comprising:
a processor; and
a non-transitory computer medium comprising instructions which, when executed by the processor, configure the device for:
determining an encoding parameterization, for an image in the sequence of images;
determining a list of coding parameters on the basis of the encoding parameterization and of at least one predefined list of coding parameters;
obtaining a video bitstream comprising:
encoded data representative of first information, the first information indicating the encoding parameterization;
encoded data representative of an element of the image, obtained by means of a coding parameter from the determined list of coding parameters, the encoded data representative of the element comprise encoded data representative of second information, the size of the encoded data representative of the second information depending on the number of coding parameters in the list of coding parameters;
wherein the predefined list of coding parameters is indexed from 0 to N−1, with N being the number of coding parameters in the predefined list, and wherein the determination of the list of coding parameters is done by selecting, on the basis of the first information:
coding parameters of indices k+n.m in the predefined list, with n a strictly positive integer and k a positive integer or zero and n+k less than or equal to N−1, and m between 0 and the integer part of (N−k−1)/n; and
coding parameters of indices strictly less than k' in the predefined list, with k' being a positive integer or zero and less than or equal to k.

19. A device for encoding a video bitstream corresponding to a sequence of images, the device comprising:
a processor; and
a non-transitory computer medium comprising instructions which, when executed by the processor, configure the device for:
determining an encoding parameterization, for an image in the sequence of images;
determining a list of coding parameters on the basis of the encoding parameterization and of at least one predefined list of coding parameters;
obtaining a video bitstream comprising:
encoded data representative of first information, the first information indicating the encoding parameterization;
encoded data representative of an element of the image, obtained by means of a coding parameter from the determined list of coding parameters, the encoded data representative of the element comprise encoded data representative of second information, the size of the encoded data representative of the second information depending on the number of coding parameters in the list of coding parameters;
wherein the determination of the list of coding parameters is done by selecting the coding parameters from the predefined list, on the basis of the first information, as a function of the levels of frequency of use of the coding parameters of the predefined list.

20. A device for encoding a video bitstream corresponding to a sequence of images, the device comprising:
a processor; and
a non-transitory computer medium comprising instructions which, when executed by the processor, configure the device for:
determining an encoding parameterization, for an image in the sequence of images;
determining a list of coding parameters on the basis of the encoding parameterization and of at least one predefined list of coding parameters;
obtaining a video bitstream comprising:
encoded data representative of first information, the first information indicating the encoding parameterization;
encoded data representative of an element of the image, obtained by means of a coding parameter from the determined list of coding parameters, the encoded data representative of the element comprise encoded data representative of second information, the size of the encoded data representative of the second information depending on the number of coding parameters in the list of coding parameters;

wherein the predefined list of coding parameters is indexed and wherein the determination of the list of coding parameters is done by selecting, on the basis of the first information:

primary coding parameters specified by the first information; and secondary coding parameters such that an index of each secondary coding parameter is comprised in $U_k[l(p)_k-\mu_k; l(p)_k+\mu_k]$ where $i(p)k$ are the indices of the primary coding parameters and $\mu_k$ are strictly positive integers specified by the first information.

* * * * *